(12) United States Patent
Tan et al.

(10) Patent No.: US 11,503,135 B1
(45) Date of Patent: Nov. 15, 2022

(54) OPTIMIZING SYSTEM ALERTS USING DYNAMIC LOCATION DATA

(71) Applicant: Dell Products L.P., Round Rock, TX (US)

(72) Inventors: Danilo O. Tan, Austin, TX (US); Daniel L. Hamlin, Round Rock, TX (US); James D. Trim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/381,751

(22) Filed: Jul. 21, 2021

(51) Int. Cl.
| | | |
|---|---|---|
| *G06F 15/16* | (2006.01) | |
| *H04L 67/55* | (2022.01) | |
| *H04L 67/146* | (2022.01) | |
| *H04L 67/306* | (2022.01) | |
| *G06Q 10/10* | (2012.01) | |
| *G06F 9/54* | (2006.01) | |
| *G06F 11/30* | (2006.01) | |

(52) U.S. Cl.
CPC ............ *H04L 67/55* (2022.05); *G06F 9/542* (2013.01); *G06F 11/3075* (2013.01); *G06Q 10/109* (2013.01); *H04L 67/146* (2013.01); *H04L 67/306* (2013.01); *G06F 2201/86* (2013.01)

(58) Field of Classification Search
CPC ..... H04L 67/26; H04L 67/146; H04L 67/306; H04L 67/55; G06F 9/542; G06F 11/3075; G06F 2201/86; G06Q 10/109

USPC .......................................... 709/201, 203, 205
See application file for complete search history.

(56) References Cited

U.S. PATENT DOCUMENTS

| | | | | |
|---|---|---|---|---|
| 2007/0118415 | A1* | 5/2007 | Chen | G06Q 10/109 |
| | | | | 705/5 |
| 2007/0264969 | A1* | 11/2007 | Frank | H04W 4/21 |
| | | | | 455/404.2 |
| 2007/0282661 | A1* | 12/2007 | Franco | G06Q 10/109 |
| | | | | 705/7.19 |
| 2011/0130950 | A1* | 6/2011 | Wexler | G01C 21/3492 |
| | | | | 701/532 |
| 2014/0207510 | A1* | 7/2014 | Valle | G06Q 10/1095 |
| | | | | 705/7.19 |
| 2015/0148077 | A1* | 5/2015 | Jelle | H04W 4/029 |
| | | | | 455/456.3 |
| 2018/0012191 | A1* | 1/2018 | Rosenberg | H04L 67/42 |
| 2019/0206259 | A1* | 7/2019 | Yun | H04W 4/02 |
| 2019/0236554 | A1 | 8/2019 | Hill | |
| 2020/0410539 | A1 | 12/2020 | Watt, Jr. et al. | |

* cited by examiner

*Primary Examiner* — Liang Che A Wang
(74) *Attorney, Agent, or Firm* — Larson Newman, LLP

(57) ABSTRACT

An information handling system includes location sensor circuitry and a processor. The location sensor circuitry determines location data for the information handling system. The processor receives a unique session tag from a cloud server. The unique session tag is utilized to identify individuals associated with an event. The processor also provides the location data for the information handling system and the unique session tag to the cloud server. The processor receives one or more proposed destination points for the event from the cloud server. The processor receives a selection of one of the proposed destination points, and provides the selected destination point to the individuals associated with the event.

18 Claims, 5 Drawing Sheets

OPTIMIZING SYSTEM ALERTS USING DYNAMIC LOCATION DATA

FIELD OF THE DISCLOSURE

The present disclosure generally relates to optimizing system alerts using dynamic location data in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes location sensor circuitry and a processor. The location sensor circuitry may determine location data for the information handling system. The processor may receive a unique session tag from a cloud server. The unique session tag may be utilized to identify individuals associated with an event. The processor also may provide the location data for the information handling system and the unique session tag to the cloud server. The processor may receive one or more proposed destination points for the event from the cloud server. The processor may receive a selection of one of the proposed destination points, and provide the selected destination point to the individuals associated with the event.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
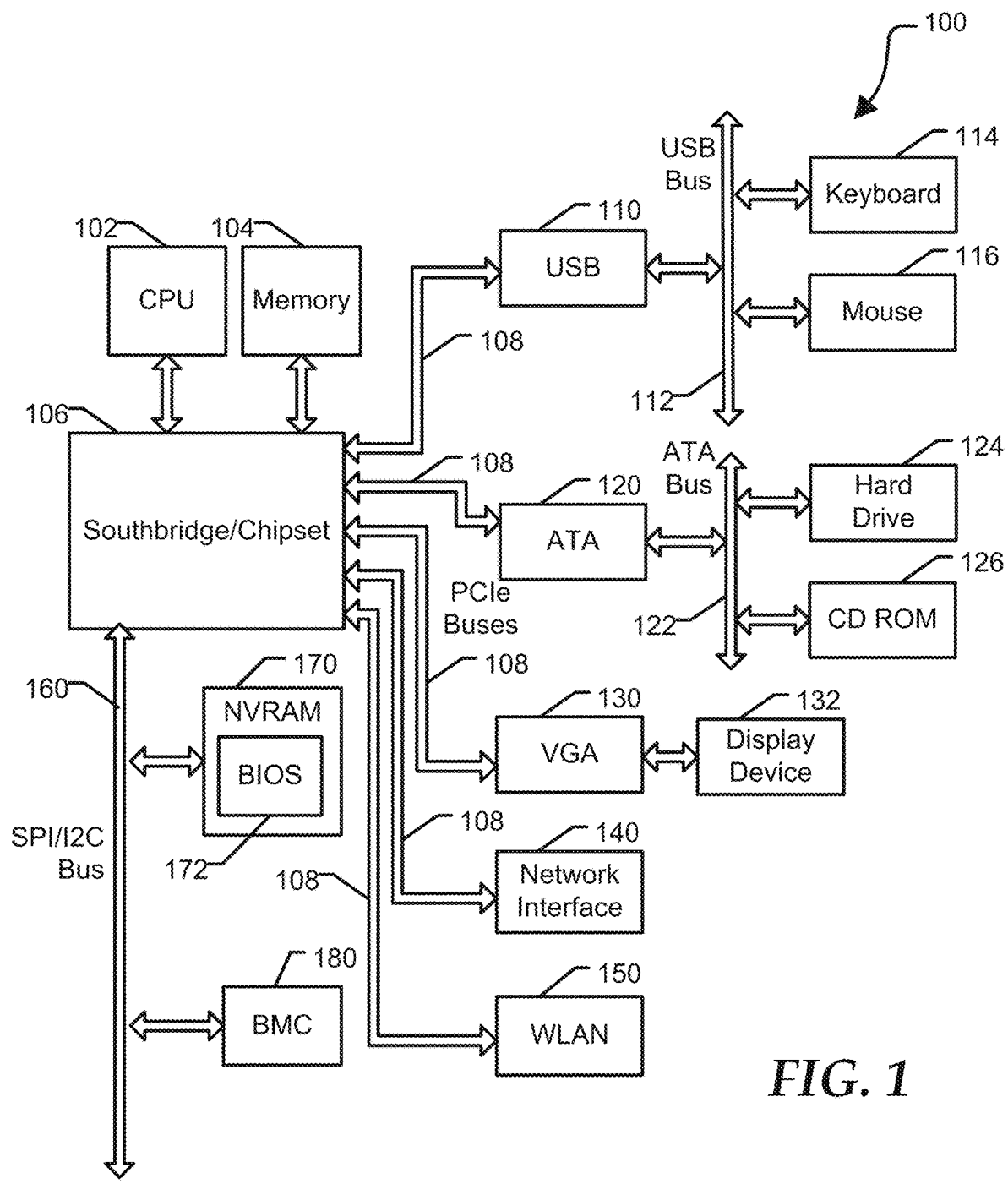
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
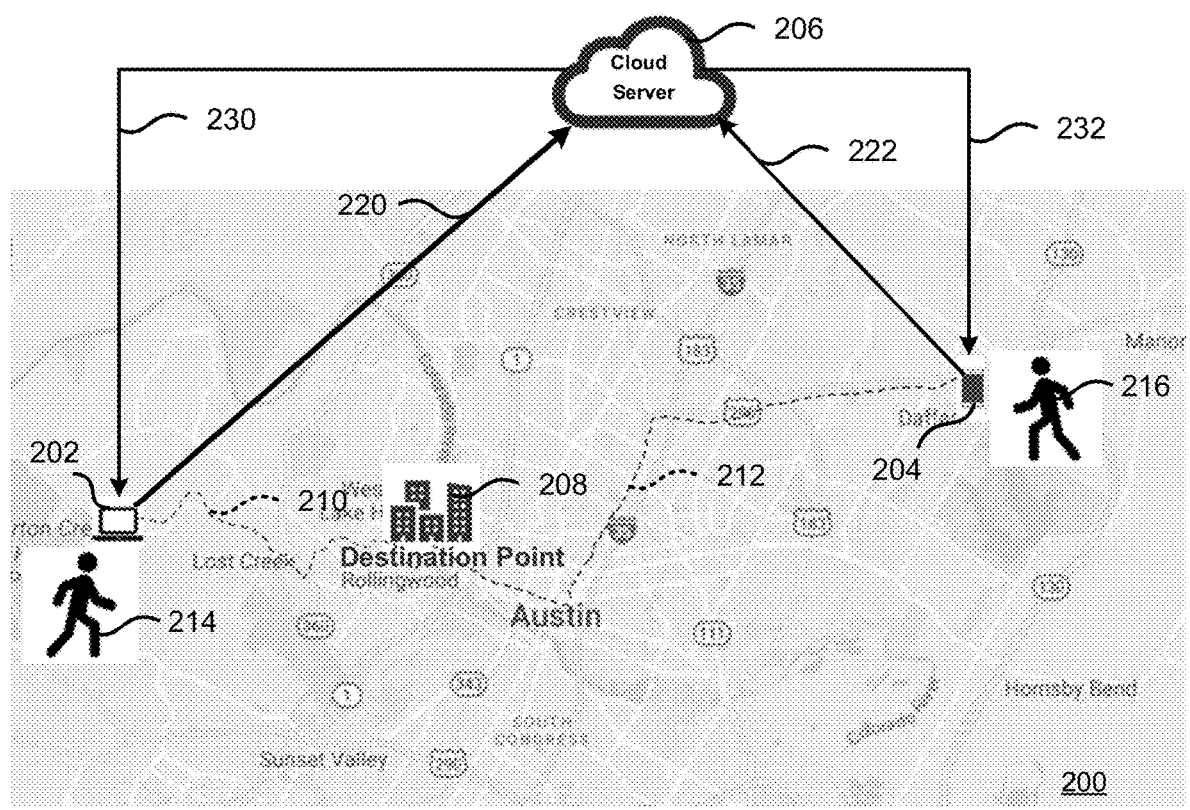
FIG. 2 is a diagram of information handling systems, a cloud server, a destination point and routes for individuals associated with an event according to at least one embodiment of the present disclosure.

In an example, information handling system 100 may be any suitable device including, but not limited to, information handling systems 202 and 204 and cloud server 206 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a map 200, information handling systems 202 and 204, a cloud server 206, a destination point 208, and routes 210 and 212 for individuals 214 and 216 associated with an event according to at least one embodiment of the present disclosure. In an example, individual 214 may be associated with information handling system 202, and individual 216 may be associated with information handling system 204. In certain examples, both individuals 214 and 216 may be associated with a particular event, such as a meeting, a social gathering, or the like. As shown on map 200, individuals 214 and 216 may be located at different locations, but may need to meet at a destination point for the event they both are associated. In previous information handling systems, the location data for a single information handling system may be utilized to determine a nearest destination point to the individual, and calculate a route for the individual to travel to the destination point. However, in the previous information handling systems, a destination point convenient for more than one individual was not able to be determined. Information handling systems 202 and 204 may be improved herein based on location data for both o the information handling systems being utilized to determine a destination point for the event that is optimum for both individuals 214 and 216.

During operation, individuals 214 and 216 may be part of an online session including themselves and possibly additional individuals. In an example, the online session may be any suitable group including, but not limited to, a chat/messaging group and an online meeting. In certain examples, in response to the online session being formed, a unique session tag may be generated. For example, cloud server 206 may communicate with information handling systems 202 and 204, and provide the unique session tag to the information handling systems.

While individuals 214 and 216 are included or part of the online session, information handling systems 202 and 204 may periodically provide location data and the unique session tag to cloud server 206 as illustrated by respective arrows 220 and 222. In an example, one or more components of information handling system 202 may be utilized to determine location data for the information handling system. For example, location sensor circuitry 312 and location application 314 of FIG. 3 may be utilized to determine location data for information handling system 202. In certain examples, the location detection device, such as location sensor circuitry 312 or location application 314 of FIG. 3, may be an active device or a passive/tile device.

Figure 3:
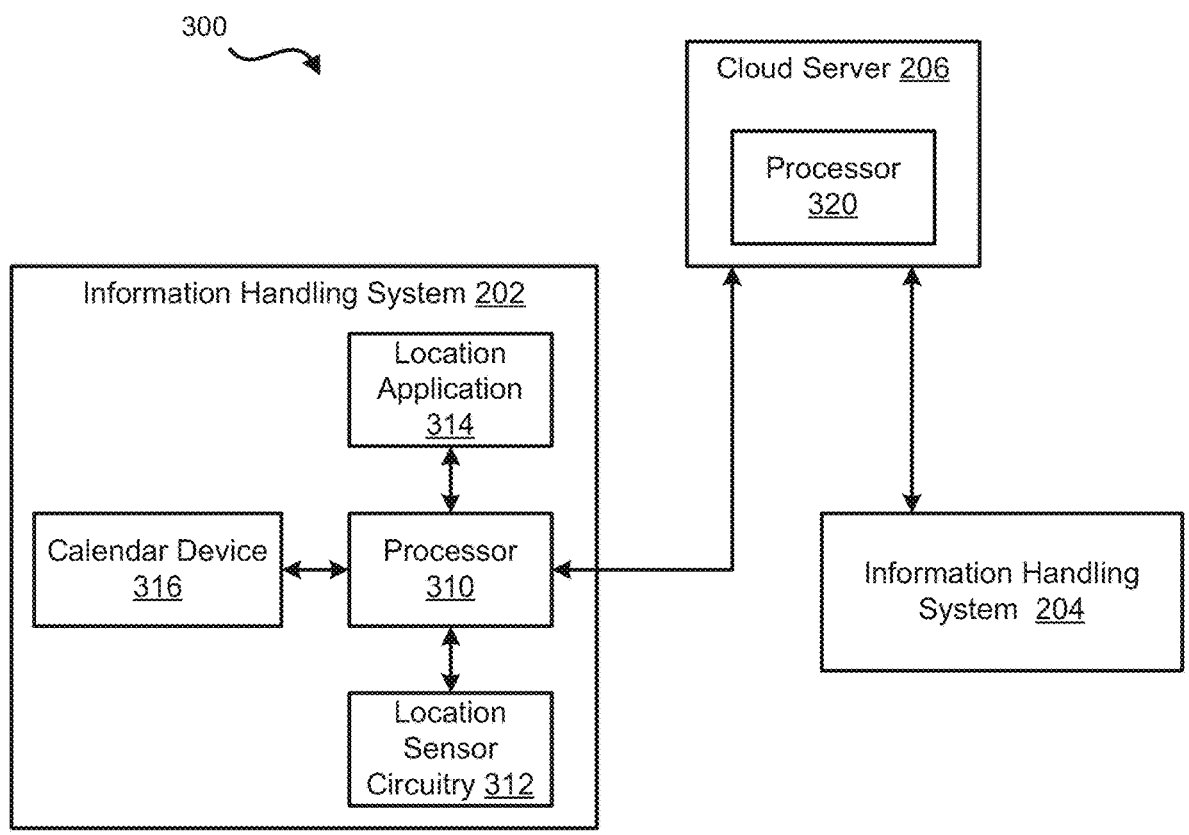
FIG. 3 is a diagram of an event location system according to at least one embodiment of the present disclosure.

FIG. 3 illustrates an event location system 300 according to at least one embodiment of the present disclosure. System 300 includes information handling systems 202 and 204 and cloud server 206. Information handling system 202 includes a processor 310, location sensor circuitry 312, location application 314, and a calendar device 316. In an example, information handling system 204 may be substantially similar to information handling system 202 and may include the same components as information handling system 202. Cloud server 206 includes a processor 320. In an example, information handling systems 202 and 204 and cloud server 206 may include additional components over those shown in FIG. 3 without varying from the scope of this disclosure. The operations of information handling systems 202 and 204 and cloud server 206 in determining a destination location for an event will be described with respect to FIGS. 2 and 3.

Referring back to FIG. 2, cloud server 206 may receive the location data and unique session tag from information handling systems 202 and 204. In certain examples, cloud server 206 may store most recent location data for each of information handling systems 202 and 204. For example, processor 320 of cloud server 206 may store the location data in a memory, such as memory 104 of FIG. 1. In certain examples, the location data from information handling systems 202 and 204 may be stored in any suitable manner. For example, processor 320 of cloud server 206 may create one or more tables in a memory of the cloud server, and each table may be associated with a different unique session tag. In this example, cloud server 206 may store the location data from information handling systems 202 and 204 in a table associated with the unique session tag of the information handling systems. The information in the table may also include a identifier for each information handling systems 202 and 204, such that the location data is associated with the correct information handling system within the table.

In an example, new individuals may be added to the online session in any suitable manner. In response to an individual being added to the online session an information handling system associated with the new individual may be provided with the unique session tag from any suitable device. For example, one or all of information handling systems 202 and 204 and cloud server 206 may provide the unique session tag to the information handling system associated with the new individual. Based on receiving the unique session tag, the information handling system associate with the new individual may periodically provide location data and the unique session tag to cloud server 206.

In an example, individuals 214 and 216 and other individuals associated with the online session may decide to meet at a physical location for an event. In certain examples, types of events may include, but are not limited to, a social gathering and a meeting. Individual 214 may utilize information handling system 202 to provide an event request to cloud server 206. In response to receiving the event request, processor 320 of cloud server 206 may determine an optimum destination point or multiple proposed destination points based on any suitable event criteria. In an example, the meeting criteria may include, but is not limited to, a proposed start time for the event, travel times for each individual associated with the event, distances for each individual associated with the event to the event, a same time of arrival for each individual associated with the event, and a central location for each individual associated with the event.

In an example, processor 320 of cloud server 206 may determine the one or more proposed destination points on location data from information handling systems 202 and 204 and based on event criteria. In examples, cloud server 206 may generate a list of proposed destination points and each proposed destination point may be associated with a different event criteria. For example, one proposed destination point may be based on individuals 214 and 216 having substantially the same amount of travel time, another proposed destination point may be based on a substantially equal amount travel distance for each individual, another proposed destination point may be based on a substantially equal time of arrival for each individual associated with the event, still another proposed destination point may be a central location for each individual associated with the event, or the like. In an example, processor 320 of cloud server 206 may proposed only a single destination point, which may be based on all the event criteria together, may be based on a single event criterion selected by individual 214 or 216, or the like. Cloud server 206 may provide the one or more proposed destinations to information handling systems 202 and 204 in any suitable format for display to the respective individual 214 and 216. For example, information handling system 202 may provide the proposed destination points to individual 214 in any suitable manner, such as a graphical user interface (GUI) on a display device of the information handling system. In an example, each proposed destination point may be provided on a map, such as map 200, so that individual 216 may select a destination point.

In certain examples, individual 214 may utilize the GUI to select one of the proposed destinations points as the determined or selected destination point 208. In response to the destination point being selected, information handling system 202 may provide the selected destination point 208 to the other information handling systems, such as information handling system 204 associated with online session and the event. Based on selected destination point 208 and the current location information handling system 202 may calculate a route 210 for individual 214 to reach the destination point. In an example, processor 310 and location application 314 of information handling system 202 may perform one or more suitable operations to calculate route 210. Similarly, information handling system 204 may calculate or determine route 212 for individual 204 to reach selected destination point 208. Based on route 210 and current travel conditions, processor 310 may calculate a departure time for individual 214, and the departure time may be presented to the individual in any suitable manner.

In an example, information handling system 202 may perform one or more suitable operation to determine whether the event is imminent. For example, processor 310 may utilize current commute times and other factors that may affect arrival time while determining if the event is imminent. Processor 310 may also receive the scheduled start time for the event from calendar device 316. In an example, processor 310 of information handling system 202 may determine whether the event is imminent based on a current time, a start time for the event, and a length of travel time to reach the event. In an example, the event may be imminent at any suitable time, such as when individual 214 may need to leave a current location to travel to selected destination point 208 and arrive before the start time for the event. In response to the event being imminent, information handling system 202 may provide an alert to individual 214. In an example, the alert may be any suitable type of alert including, but not limited to, an audio alert, a visual alert, and a haptic alert.

While individual 214 is traveling to destination point 208, such as along route 210, information handling system 202 may determine whether the arrival time for the individual is delayed. In certain examples, a delay in the arrival time may be as compared to an originally determined time or arrival, the start time of the event, or the like. In response to the arrival time being delayed, a delay notification may be provided to the other individuals, such as individual 216, associated with the event. In an example, the delay notification may provide any suitable information to indicate that the individual is delayed. For example, the delay notification may include a new arrival time for the individual, a new proposed destination point, a new start time for the event, or the like.

Figure 4:
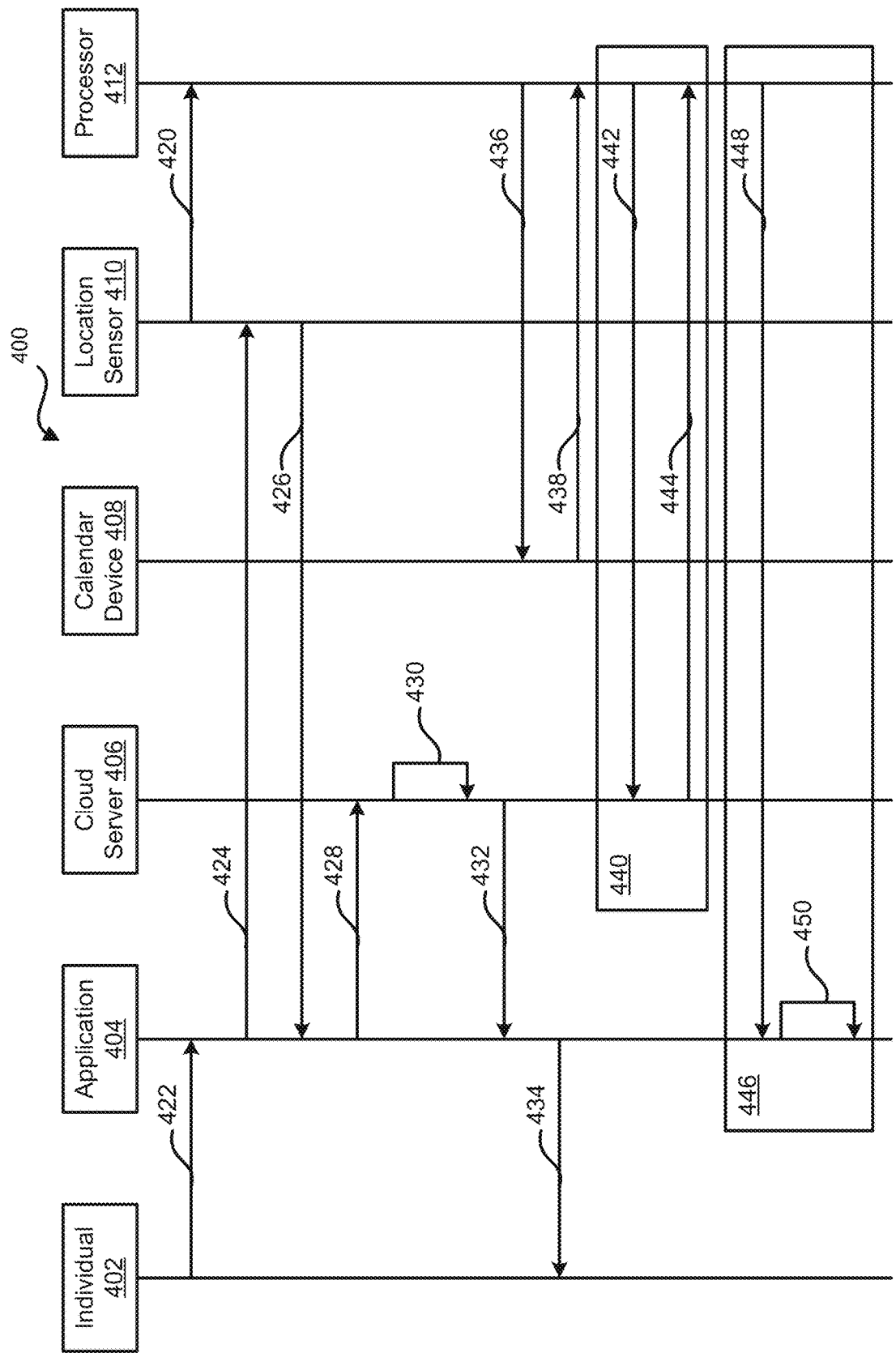
FIG. 4 is a flow diagram of a method for determining details of an event according to at least one embodiment of the present disclosure.

FIG. 4 illustrates flow diagram of a method 400 for determining details of an event according to at least one embodiment of the present disclosure. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by an individual 402, an application 404, a cloud server 406, a calendar device 408, a location sensor 410, and a processor 412.

At step 420, location sensor 410 may continuously provide location data for the information handling system to processor 412. At step 422, individual 402 may interface with application 404 and request an event location. In an example, the event may be any suitable event, such as a meeting, a social gathering, or the like. In response to the event request, application 404 may request location data for the information handling system from location sensor 410 at step 424. At step 426, location sensor 410 may provide the location data to application 404.

At step 428, application 404 may provide an event location request to cloud server 406. At step 430, cloud server 406 may determine an optimum location for the event based on location data from all participants of the event. In an example, each information handling system may provide its location data to cloud server 406. At step 432, cloud server 406 may provide the optimum location to application 404. At step 434, application 404 may provide the optimum location to individual 402.

At step 436, processor 412 may request a meeting time from calendar device 408. At step 438, calendar device 408 may provide the meeting time to processor 412. A loop of operations 440 may include steps 442 and 444. At step 442, processor 412 requests a travel time from cloud server 406. In an example, the travel time may be any suitable amount of time, such as a remaining amount of travel time based on a current location of the individual and the destination location. At step 444, cloud server 406 may provide the travel time to processor 412. In an example, steps 442 and 444 of loop 440 may repeat until a loop exit condition is met. In certain examples, the loop exit condition may be any suitable condition including, but not limited to, the destination location is reached and the time of arrival is delayed.

In response to a determination that the time of arrival is delayed, late time of arrival operations 446 are performed. At step 448, processor 412 may provide a late time of arrival message to application 404. At step 450, application 404 may provide the late time of arrival message to all participants of the event.

Figure 5:
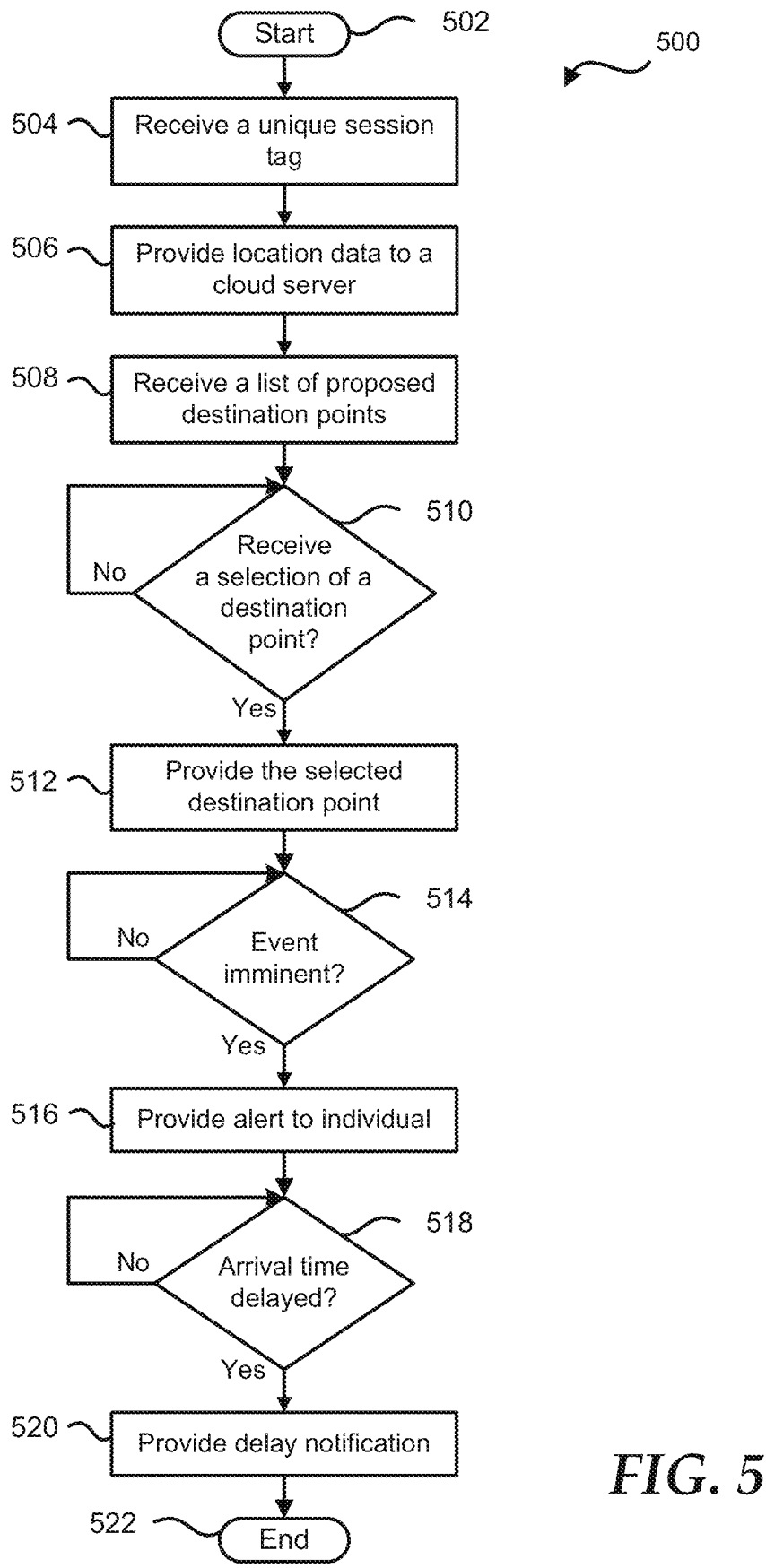
FIG. 5 is a flow diagram of a method for optimizing system alerts using dynamic location data according to at least one embodiment of the present disclosure.

FIG. 5 illustrates flow diagram of a method 500 for optimizing system alerts using dynamic location data according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling systems 202 and 202 of FIG. 2, information handling systems 302 and 304 of FIG. 3, or any other type of system, controller, device, module, processor, or any combination thereof, operable to employ all, or portions of, the method of FIG. 5.

At block 504, a unique session tag is received at an information handling system. In an example, the unique session tag may identify an individual associated with the information handling system as a participant of an event. The event may be any suitable gathering of multiple individuals, such as a meeting, a party, or the like. In certain examples, the unique session tag may be received from any suitable device including, but not limited to, another information handling system associated with the event, and a cloud server.

At block 506, location data for the information handling system is provided to the cloud server. In an example, the location data may be collected by any suitable component of the information handling system including, but not limited to, location sensor circuitry and a location application. In certain examples, a processor of the information handling system may retrieve the location data from the location sensor circuitry or the location application, and provide the retrieved location data to the cloud server.

At block 508, a list of proposed destination points may be received. In an example, the proposed destination points may be associated with the event identified by the unique session tag. In certain examples, the proposed destination points may be determined based on location data from multiple information handling systems and based on event criteria. The event criteria may be any suitable criteria that may be utilized to calculate proposed destination points including, but not limited to, travel times for each individual associated with the event, distances for each individual associated with the event to the event, a same time of arrival for each individual associated with the event, and a central location for each individual associated with the event.

At block 510, a determination is made whether a selection of a destination point has been received. In an example, the information handling system may provide the proposed destination points to the associated individual in any suitable manner, such as a graphical user interface (GUI) on a display device of the information handling system. The individual may utilize the GUI to select one of the proposed destinations points as the determined or selected destination point.

In response to the destination point being selected, the selected destination point is provided to other information handling systems for individuals associated with the event at block 512. At block 514, a determination is made whether the event is imminent. In an example, this determination may be made based on any suitable data. For example, the processor of the information handling system may determine whether the event is imminent based on a current time, a start time for the event, and a length of travel time to reach the event. In an example, the event may be imminent at any suitable time, such as when the individual may need to leave a current location to travel to the selected destination point and arrive before the start time for the event. In certain examples, a departure time may be calculated based on current travel conditions, and the departure time may be utilized to determine when the even is imminent.

In response to the event being imminent, an alert is provided to the individual associated with the information handling system at block 516. In an example, the alert may be any suitable type of alert including, but not limited to, an audio alert, a visual alert, and a haptic alert. At block 518, a determination is made whether the arrival time for the individual is delayed. In certain examples, a delay in the arrival time may be as compared to an originally determined time or arrival, the start time of the event, or the like. In response to the arrival time being delayed, a delay notification is provided to the other individuals associated with the event at block 520 and the flow ends at block 522. In an example, the delay notification may provide any suitable information to indicate that the individual is delayed. For example, the delay notification may include a new arrival time for the individual, a new proposed destination point, or the like.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

What is claimed is:

1. An information handling system comprising:
   location sensor circuitry to determine location data for the information handling system; and
   a processor to communicate with the location sensor circuitry, the processor to:
   receive a unique session tag, wherein the unique session tag is utilized to identify individuals associated with an event;
   provide the location data for the information handling system and the unique session tag to a cloud server;
   receive, from the cloud server, multiple proposed destination points for the event;
   provide the multiple proposed destination points on a graphical user interface on a display device of the information handling system, wherein the graphical user interface includes a map identifying each of the multiple proposed destination points;
   receive a selection of one of the proposed destination points;
   provide the selected destination point to the individuals associated with the event;
   determine whether an arrival time for the individual is delayed based on a current time, a start time for the event, and a remaining amount of travel time to reach the event; and
   in response to the arrival time for the individual being delayed, provide a new proposed destination point to all of the individuals associated with the event.

2. The information handling system of claim 1, further comprising:
   a calendar device to communicate with the processor, the calendar device to store a start time for the event, wherein the processor further to:
   determine whether the event is imminent based on a current time, the start time for the event, and a length of travel time to reach the event; and
   in response to the event being imminent, provide an alert to an individual associated with the information handling system.

3. The information handling system of claim 1, wherein the proposed destinations are determined based on the location data for the information handling system and location data for all of the individuals associated with the event.

4. The information handling system of claim 3, wherein each of the proposed destinations is further based on a different event criteria.

5. The information handling system of claim 4, wherein the event criteria includes travel times for each individual associated with the event, distances for each individual associated with the event, a same time of arrival for each individual associated with the event, and a central location for each individual associated with the event.

6. The information handling system of claim 1, wherein the processor further to:
   provide a new individual with the unique session tag to enable the new individual to join the event.

7. The information handling system of claim 1, wherein the processor further to:
   receiving routing directions from a current location of the individual to the selected destination point.

8. A method comprising:
   receiving, by a processor of an information handling system, a unique session tag, wherein the unique session tag is utilized to identify individuals associated with an event;
   providing location data for the information handling system and the unique session tag to a cloud server;
   receiving multiple proposed destination points for the event;
   providing, by the processor, the multiple proposed destination points on a graphical user interface on a display device of the information handling system, wherein the graphical user interface includes a map identifying each of the multiple proposed destination points;
   receiving a selection of one of the proposed destination points;
   providing the selected destination point to the individuals associated with the event;
   determining whether an arrival time for the individual is delayed based on a current time, a start time for the event, and a remaining amount of travel time to reach the event; and
   in response to the arrival time for the individual being delayed, providing a new proposed destination point to all of the individuals associated with the event.

9. The method of claim 8, further comprising:
   determining whether the event is imminent based on a current time, a start time for the event, and a length of travel time to reach the event; and
   in response to the event being imminent, providing an alert to an individual associated with the information handling system.

10. The method of claim 8, further comprising:
    determining the one or more proposed destinations based on the location data for the information handling system and location data for all of the individuals associated with the event.

11. The method of claim 10, wherein each of the proposed destinations is further based on a different event criteria.

12. The method of claim 11, wherein the event criteria includes travel times for each individual associated with the event, distances for each individual associated with the event, a same time of arrival for each individual associated with the event, and a central location for each individual associated with the event.

13. The method of claim 8, further comprising:
    providing a new individual with the unique session tag to enable the new individual to join the event.

14. The method of claim 8, further comprising:
    receiving routing directions from a current location of the individual to the selected destination point.

15. A method comprising:
    providing, by a processor of a cloud server, a unique session tag to first and second information handling systems, wherein the unique session tag is utilized to identify individuals associated with an event;
    receiving, from the first information handling system, first location data for the first information handling system and the unique session tag;
    receiving, from the second information handling system, second location data for the second information handling system and the unique session tag;
    determining a multiple proposed destination points for the event based on the first and second location data and based on event criteria;
    providing the destination points to the first and second information handling systems, wherein the proposed destination points are provided on a graphical user interface on a display device of the information handling system, wherein the graphical user interface includes a map identifying each of the multiple proposed destination points;

determining whether an arrival time for the individual is delayed based on a current time, a start time for the event, and a remaining amount of travel time to reach the event; and in response to the arrival time for the individual being delayed, providing a new proposed destination point to all of the individuals associated with the event.

16. The method of claim 15, the destination points are provided in a list of proposed destination points.

17. The method of claim 16, wherein each of the proposed destinations is based on a different event criteria.

18. The method of claim 15, wherein the event criteria includes travel times for each individual associated with the event, distances for each individual associated with the event, a same time of arrival for each individual associated with the event, and a central location for each individual associated with the event.

* * * * *